A. E. HACKING.
ELECTRICALLY LIGHTING UP GAS LAMPS.
APPLICATION FILED MAY 20, 1907.
932,273.
Patented Aug. 24, 1909.
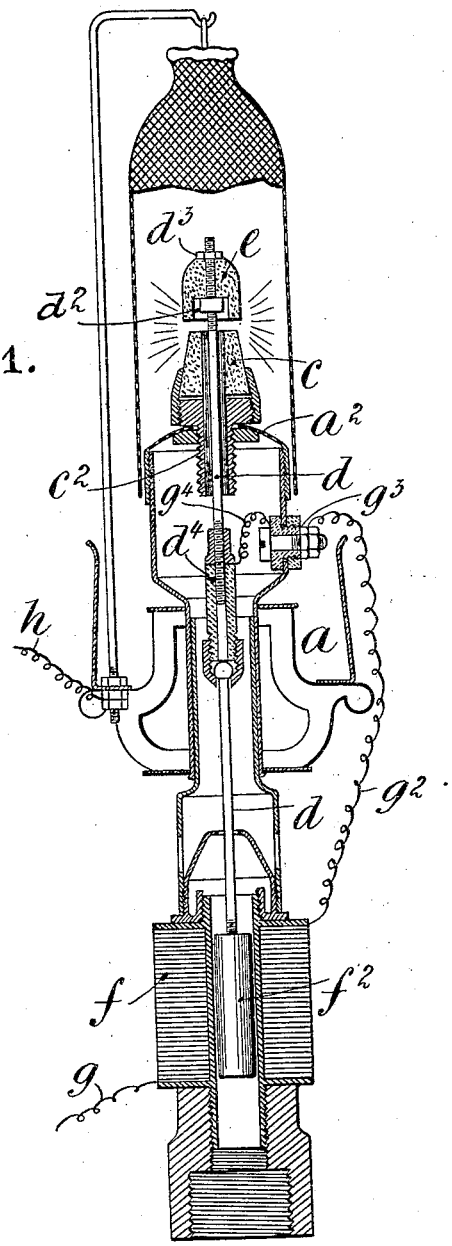
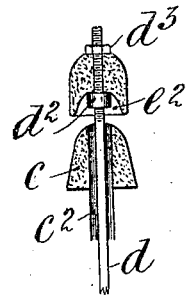

UNITED STATES PATENT OFFICE.

ALBERT ERNEST HACKING, OF WEST BRIDGFORD, NOTTINGHAM, ENGLAND.

ELECTRICALLY LIGHTING UP GAS-LAMPS.

932,273.

Specification of Letters Patent. Patented Aug. 24, 1909.

Application filed May 20, 1907. Serial No. 374,702.

*To all whom it may concern:*

Be it known that I, ALBERT ERNEST HACKING, a subject of the King of Great Britain, residing at West Bridgford, Nottingham, England, have invented certain new and useful Improvements Connected with Electrically Lighting Up Gas-Lamps, of which the following is a specification.

The invention relates distinctly to gas lamps electrically ignited, and comprises improvements whereby the gas is lighted up at the burner by an electric arc formed by separating terminals, preferably carbon, which are normally together, and by which said arc is sustained (in the same way as the arc of an arc lamp is sustained) so long as the means for separation are in operation, thereby providing for the certain ignition of the gas. The separation aforesaid is primarily through a hand-operated means, preferably, bringing into action a solenoid, the core of which, by its weight, normally brings the said terminals together.

In the application of the invention to an incandescent gas burner of a known kind, a small central rod passes down the fixed burner and through the crown thereof, and at its upper end supports a carbon block which is therefore central of the burner and which normally rests upon a conducting ferrule, bush, or the like, preferably of carbon, forming the central part of the burner crown. Both terminals are therefore within the mantle. The lower end of the rod may be directly or indirectly connected to the core of the solenoid aforesaid. The under side of the upper carbon block may be concave with the top-side of the lower carbon, ferrule, or bush, slightly convex. The rod is insulated from the ferrule bush or the like and from the burner body, and may be made adjustable as to length. The movement of the terminals for arcing may be accomplished mechanically instead of electrically.

Upon the sheet of drawings the invention is represented in one form and with a slight variation of the arcing terminals, Figure 1 being a vertical section through an incandescent burner with the invention applied, and Fig. 2 a detail view of a slight modification of the arcing terminals.

The burner body is represented at $a$, it being of any suitable construction for the application of the invention. Centrally upon the crown $a^2$ of the burner is provided a fixed arcing terminal $c$ electrically connected to the burner body. In Fig. 1 the upper end of this terminal is flat while in the variation Fig. 2 it is convex. An electrical conductor in the form of a thin rod $d$ works centrally through the fixed terminal $c$ (from which it is insulated by the bushing $c^2$) to support and carry rigidly at its upper end, above the fixed terminal aforesaid, a movable arcing terminal $e$. The lower end of the rod $d$ is connected to the core, $f^2$, of a solenoid, $f$, by the operation of which the rod is moved up and down to control the arcing, the movable terminal normally resting upon the top of the fixed terminal by the weight of the solenoid core.

The under side of the movable arcing terminal $e$ is concaved at $e^2$ in both arrangements shown to accommodate a conducting collar $d^2$ of the rod $d$ (which collar must be kept clear of the fixed terminal $c$ at all times) and to make more effective the arcing, the said terminal being fixed to the rod $d$ between the collar $d^2$ aforesaid and a further collar or screw nut $d^3$ on the top of the said terminal, it being preferable to make the said terminal an adjustable fixture upon the end of the rod $d$.

In the drawings the rod $d$ is represented as built up of parts connected to each other at $d^4$ so that the rod is adjustable as to its length, but this is optional.

The current passes to the solenoid by the wire $g$ and from the solenoid by the wire $g^2$ through the connection $g^3$ and the wire $g^4$ to the central rod $d$, and thence to the moving arcing terminal, which is moved by the solenoid to momentarily form an ignition arc which can be sustained (while the gas lights) between the two terminals, the return passing from the fixed terminal through the burner body to the wire $h$. The operation of a switch (not shown) separates the terminals and closes the arcing circuit, but it will be obvious that the terminals may be separated by an operation other than electrical, as, for instance, by a separate hand lever, the gas being turned on either by hand through mechanical arrangements, or in some convenient and known way electrically.

A single gas burner can be lighted up by the invention or a number of burners simultaneously, the burners being either arranged in series or parallel with each other, but particularly the invention admits of the burners being connected up in series and lighted up simultaneously. It has hitherto been proposed in electrically lighting up miners' safety lamps (which burn oil) to use carbon terminals or tips which are normally separated to break the circuit, and which are spring operated to such separated positions, and which require to be brought together by hand before they automatically separate to cause a momentary spark which although referred to as an arc light, or a spark, is distinctive from an arc flame inasmuch as it is not and cannot be a sustained bow of light, and no claim is herein made to the use of such devices, the invention only existing in connection with gas lamps. Further in connection with an incandescent gas burner for electrically lighting up a gas it has hitherto been proposed to use sparking terminals normally together and within the mantle, and one of which is lifted for separation by an electro-magnet through a rod central of the burner, which rod at its upper end carries the movable sparking terminal, the electro-magnet also providing means for simultaneously turning on the gas, and no claim herein is made to such features, the primary part of the present invention consisting in the ability to sustain an electric arc flame until the gas is lighted up.

By the invention the use of the weight of the core of the solenoid, or equivalent means, for normally bringing the arcing terminals together positively insures the normal positions of the said terminals being attained, the said core being at all times freely depending through the center of the burner from the carbons.

Having now described my invention, what I claim and desire to secure by Letters Patent is:—

1. In an incandescent gas burner of the type set forth, in combination, two carbon electrodes, one of which is fixed and the other movable axially, the movable electrode having a cupped under face, an electric ignition circuit including said electrodes, means active to hold the movable carbon electrode normally against the fixed carbon to take up wear, and means for actuating and sustaining the movable electrode away from the fixed electrode when said circuit is closed.

2. In an incandescent gas burner of the type set forth, in combination, two electrodes, the lower electrode being fixed, and the upper electrode being movable with respect to the lower electrode, a rod carrying the upper electrode and pendent therefrom, said rod passing through said central opening and through the burner and terminating in a weight which serves to hold the upper electrode normally upon the lower electrode and to thereby take up wear, an electric ignition circuit including said electrodes, and means for moving and sustaining the upper electrode away from the lower electrode comprising a solenoid in said circuit, said weight forming the core of said solenoid and being raised thereby when the circuit is closed.

3. In an incandescent gas burner of the type set forth, in combination, two electrodes disposed axially of the burner, one of said electrodes being axially movable toward and away from the other electrode, an electric ignition circuit including said electrodes, means for actuating and sustaining the movable electrode away from its companion electrode when the circuit is closed and means for adjusting one of said electrodes in the direction of its axis and with respect to the other electrode.

4. In an incandescent gas burner of the type set forth, in combination, two carbon electrodes, one of which is fixed and the other movable axially, an electric ignition circuit including said electrodes, means active to hold the movable carbon electrode normally against the fixed carbon to take up wear, and means for actuating and sustaining the movable electrode away from the fixed electrode when the circuit is closed.

In witness whereof I have hereunto set my hand in presence of two witnesses.

ALBERT ERNEST HACKING.

Witnesses:
MARIE HACKING,
ETHEL MINNIE HACKING.